United States Patent [19]

Lomp et al.

[11] Patent Number: 5,740,206
[45] Date of Patent: Apr. 14, 1998

[54] ADAPTIVE NONLINEAR EQUALIZER FOR DIGITAL FM SIGNALS

[75] Inventors: Gary R. Lomp, New York; Donald L. Schilling, Sands Point, both of N.Y.

[73] Assignee: InterDigital Technology Corporation, Wilmington, Del.

[21] Appl. No.: 109,480

[22] Filed: Aug. 20, 1993

Related U.S. Application Data

[63] Continuation of Ser. No. 732,199, Jul. 19, 1991, abandoned.
[51] Int. Cl.⁶ .................................................. H04B 1/10
[52] U.S. Cl. .................................... 375/346; 375/285
[58] Field of Search ............................ 375/232, 265–266, 375/292, 285, 334, 340, 341, 346, 350; 371/43; 455/63

[56] References Cited

U.S. PATENT DOCUMENTS

| | | | |
|---|---|---|---|
| 4,408,332 | 10/1983 | Sari | 375/232 |
| 4,468,786 | 8/1984 | Davis | 375/229 |
| 4,833,693 | 5/1989 | Eguboglu | 375/254 |
| 4,847,864 | 7/1989 | Cupo | 375/232 |
| 5,115,452 | 5/1992 | Cupo | 375/232 |
| 5,119,400 | 6/1992 | Koch | 375/230 |

OTHER PUBLICATIONS

"New Trellis Codes Based on Lattices and Cosets," A.R. Calderbank and N.J.A. Sloane, IEEE Transactions on Information Theory, vol. IT–33, No. 2, pp. 177–195, Mar. 1987.

*Primary Examiner*—Young T. Tse
*Attorney, Agent, or Firm*—David Newman & Associates, P.C.

[57] ABSTRACT

A method for reducing distortion of an information symbol in an information symbol sequence. The information symbol sequence is transformed to a channel symbol sequence for modulating a carrier signal. The channel symbol sequence employs an M-ary signalling scheme. A received signal, which includes a channel symbol, a distortion value and a noise value, is demodulated as a received sample. An index value is determined from a previous information symbol interval. Using the index value the method selects an inverse distortion function for processing the received sample. A corrected sample is calculated using the inverse distortion function. The method determines a value of an information symbol, and a respective index, from the corrected sample. The method includes an adaption phase. The adaption phase adapts the nonlinear equalizer using a linear distortion function. The information symbol sequence is transformed to a channel symbol sequence of an M-ary signalling scheme with index value, for modulating a carrier signal. For each index value, the method includes the step of demodulating a training symbol sequence having pure symbol values as an observed sample sequence. A mean squared value and a mean value is calculated of the observed sample sequence. A mean squared value is calculated of the training symbol sequence. A cross correlation value is calculated. At least two simultaneous equations are solved for coefficients.

9 Claims, 4 Drawing Sheets

Fig. 3

100 — DEMODULATING A RECEIVED SIGNAL AS A RECEIVED SAMPLE, $r_k$, THE RECEIVED SIGNAL INCLUDING A CHANNEL SYMBOL, A DISTORTION VALUE AND A NOISE VALUE.

110 — DETERMINING AN INDEX VALUE, $j$, FROM A PREVIOUS CHANNEL SYMBOL.

120 — SELECTING, USING THE INDEX VALUE, $j$, AN INVERSE DISTORTION FUNCTION, $f_j(r_k)$, FOR PROCESSING THE RECEIVED SAMPLE, $r_k$.

130 — COMPUTING A CORRECTED SAMPLE, $\hat{s}_k$, USING THE INVERSE DISTORTION FUNCTION, $f_j(r_k)$, FOR THE INDEX VALUE.

140 — DETERMINING A VALUE OF AN INFORMATION SYMBOL, $i_k$, AS A CORRECTED INFORMATION SYMBOL, $\hat{i}_k$, AND A NEXT INDEX, $j$, FROM THE CORRECTED SAMPLE, $\hat{s}_k$ TO GENERATE A CORRECTED INFORMATION SYMBOL SEQUENCE, $\{\hat{i}_k\}$, AS AN OUTPUT SIGNAL TO ENABLE HIGHER INFORMATION RATES IN A GIVEN BANDWIDTH.

150 — SELECTING, USING THE NEXT INDEX, $j$, THE INVERSE DISTORTION FUNCTION, $f_j(r_k)$, FOR PROCESSING A SUBSEQUENT RECEIVED SAMPLE, $r_k$, IN A SUBSEQUENT INFORMATION INTERVAL.

ADAPTIVE NONLINEAR EQUALIZER FOR DIGITAL FM SIGNALS

This application is a continuation of application Ser. No. 07/732,199, filed on Jul. 19, 1991, now abandoned.

BACKGROUND OF THE INVENTION

This invention relates to an adaptive nonlinear equalizer digital frequency modulation (FM) signals, and more particularly to an adaptive nonlinear equalizer which compensates for nonlinear effects, due to limited bandpass of a communications channel and filters, on digital FM signals.

DESCRIPTION OF THE RELEVANT ART

The transmission of an FM signal is well known in the art to require a bandwidth obeying Carson's rule. Carson's rule states that the required bandwidth, $B_T$, for an FM signal is twice the sum of the maximum frequency deviation, $f_d$, and the bandwidth of the message signal, $f_x$.

$$B_T = 2(f_d + f_x)$$

Another method for finding the transmission bandwidth of an FM signal for a given modulation index, $\beta$, is to find the smallest value of n that yields $S_n \geq 0.98$ for the following equation:

$$S_n = \sum_{k=-n}^{n} J_k^2(\beta)$$

where $J_k(\beta)$ are Bessel functions of the first kind. This method is labeled herein as the 98% rule. The 98% rule determines the bandwidth of an FM signal that has 98% of the power of the FM signal.

The two foregoing rules for determining the FM bandwidth yield the same result if the modulating signal is a sinewave; however these rules may yield different results for a digital FM signal. The 98% rule may require a bandwidth which is not adequate for digital FM, while Carson's rule may require a bandwidth which is significantly greater than required. Although the bandwidth required by Carson's rule is adequate, it may be excessive, and the narrower bandwidth criteria of the 98% rule is more desirable.

The power determined by the 98% rule usually is less than the power that passes through a bandwidth determined by Carson's rule for digital FM signals. If the bandwidth of filters and communications channel passes only 98% of the power of a FM modulated digital signal, then the filtered FM signal typically cannot be demodulated without increased errors. Because the nature of distortion from a narrowband filter on an FM signal is nonlinear, i.e., the channel for pre-demodulation filter(s) has a nonlinear effect on a received FM signal, linear equalization techniques such as transversal filters are not effective. While the noise causes errors, the filter produces distortion, which narrows the "eye", and which increases the error rate due to noise.

OBJECTS OF THE INVENTION

A general object of the invention is a nonlinear equalizer which corrects for the concomitant nonlinear effect of filtering the input noise on a narrow bandwidth FM signal.

Another object of the invention is a nonlinear equalizer which allows the transmission of a digital FM signal through communications channels and filters having a narrow bandwidth.

A further object of the invention is a nonlinear equalizer which allows power efficient, narrow bandwidth digital FM communications.

SUMMARY OF THE INVENTION

According to the present invention, as embodied and broadly described herein, a method for reducing distortion of a $k^{th}$ information symbol of an information symbol sequence, $\{i_k\}$, with $k^{th}$ being a generic reference to one of a plurality of symbols in a given sequence, is provided. The information symbol sequence, $\{i_k\}$, has a plurality of information symbols with each information symbol representing n bits, with n being a number of bits in each information symbol. The information symbol sequence is transformed to a channel symbol sequence, $\{s_k\}$, for modulating a carrier signal. The channel symbol sequence has M symbols of an M-ary signalling scheme with index value, j, $1 \leq j \leq M$, with M being a number of channel symbols. During an operating phase, the method includes the step of demodulating a received signal as a received sample, $r_k$. The received signal includes a channel symbol, a distortion value and a noise value. An index value, j, is determined from a previous information symbol interval. Using the index value, j, the method selects an inverse distortion function, $f_j(r_k)$, for processing the received sample, $r_k$. A corrected sample, $\hat{s}_k$, is calculated using the inverse distortion function, $f_j(r_k)$, for the index value. The method determines a value of an information symbol, $i_k$, and a respective index, j, from the corrected sample, $\hat{s}_k$.

Another aspect of the invention is an adaptation phase. The adaptation phase adapts a nonlinear equalizer using a linear distortion function, $f_j(x)=a_j x+b_j$, for reducing distortion of a $k^{th}$ channel symbol of a channel symbol sequence, $\{s_k\}$, with $k^{th}$ being a generic reference to one of a plurality of symbols in a given sequence. The information symbol sequence, $\{i_k\}$, has a plurality of information symbols, with each information symbol having a time duration with n bits, with n being a number of bits in each information symbol. The information symbol sequence is transformed to a channel symbol sequence of an M-ary signalling scheme with index value, j, $1 \leq j \leq M$, for modulating a carrier signal. For each index value, j, the method includes the step of demodulating a training symbol sequence, $\{\sigma_k\}_j$, having pure symbol values, $\sigma_k$, as an observed sample sequence, $\{r_k\}_j$. A mean squared value is calculated for the observed sample sequence, $E_j\{r_k^2\}$. A mean value is calculated for the observed sample sequence, $E_j\{r_k\}$. A mean value, $E_j\{\sigma\}$, and a mean squared value, $E_j\{\sigma_k^2\}$, are calculated for the training symbol sequence. A cross correlation value, $E_j\{r_k\sigma_k\}$ is calculated. Two simultaneous equations $$a_j E_j\{r_k\}+b_j=E_j\{\sigma_k\}$$

$$a_j E_j\{r_k^2\}+b_j E_j\{r_k\}=E_j\{\sigma_k r_k\}$$

are solved for coefficients $a_j$ and $b_j$.

The foregoing invention can be extended to vectors of received signals, as set forth in the Detailed Description of the Preferred Embodiments.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 3 is a flowchart of an operating phase of the present invention;

DETAILED DESCRIPTION OF THE PREFERRED EMBODIMENTS

Figure 1:
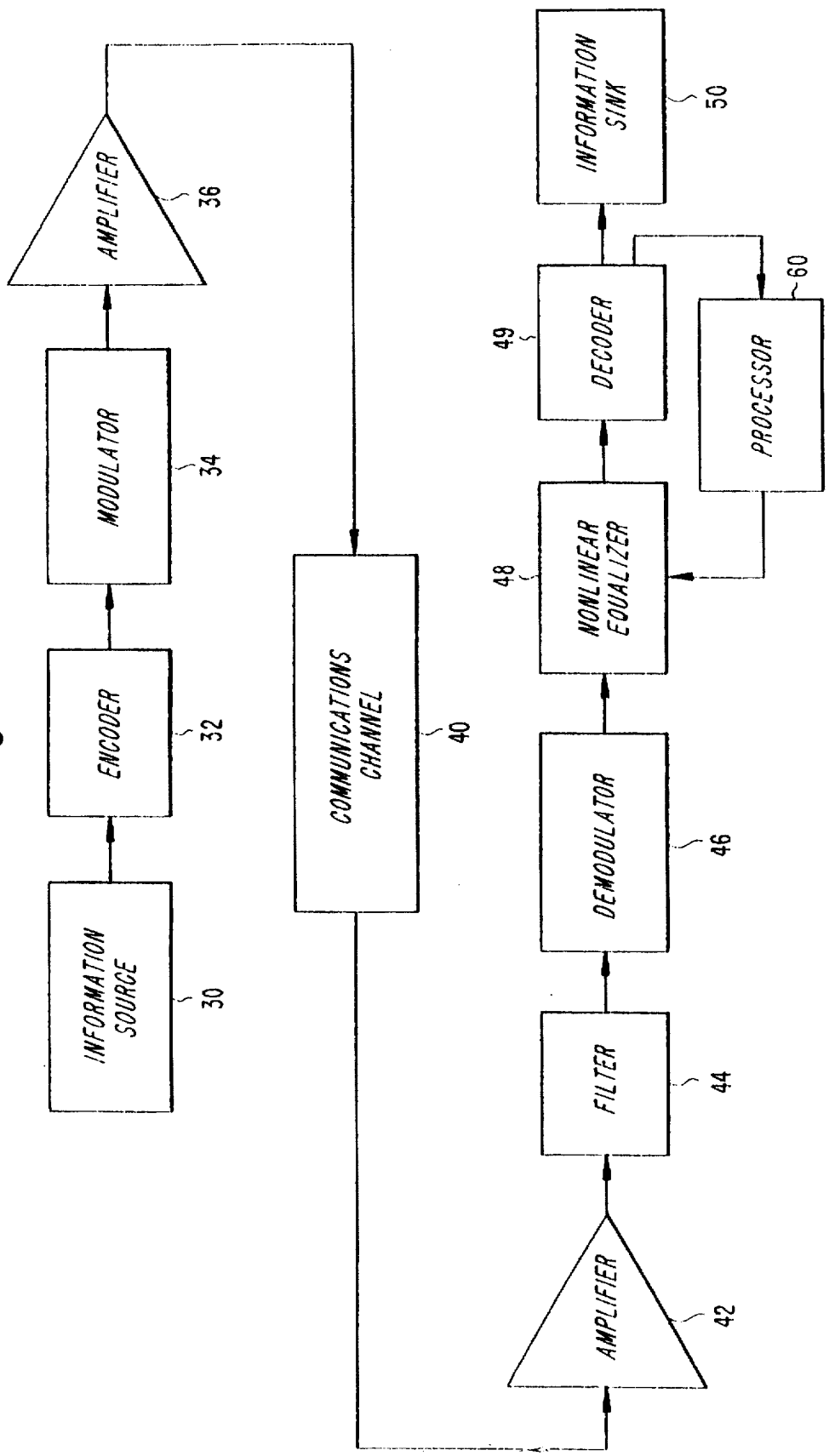
FIG. 1 is a block diagram of an FM data communications system using a nonlinear equalizer.

Reference will now be made in detail to the present preferred embodiments of the invention, examples of which are illustrated in the accompanying drawings, wherein like reference numerals indicate like elements throughout the several views.

In the exemplary arrangement shown in FIG. 1, a communications system is shown including an information source 30, an encoder 32, a modulator 34, a transmitter amplifier 36, a communications channel 40, a receiver amplifier 42, a receiver filter 44, a demodulator 46, a nonlinear equalizer 48, a processor 60, a decoder 49 and an information sink 50. The encoder 32, which is optional, is coupled between the information source 30 and modulator 34. The modulator 34 is coupled through the transmitter amplifier 36 to the communications channel 40. The receiver filter 44 is coupled to a demodulator 46, and through the receiver amplifier 42 to the communications channel 40. The nonlinear equalizer 48 is coupled to the demodulator 46, to the processor 60, and to the decoder 49. The decoder 49 is required only if the encoder 32 is used. The decoder 49 is coupled to the information sink 50. Also, the output of the decoder 49 is coupled to the nonlinear equalizer 48 through the processor 60. If the decoder 49 is not used, then the output of the nonlinear equalizer 48 is also an input to the nonlinear equalizer 48 through the processor 60.

The information source 30 may be the source of any type of data signal to be transmitted over the communications channel 40. The information source 30 may be from digitized voice, data, digitized video, or any other data signal which is to be sent over the communications channel 40.

The encoder 32, is optional, but preferably is used with the present invention. The encoder 32 may be a trellis encoder for trellis encoding data from the information source 30. The modulator 34 is a frequency modulation (FM) device and uses M-ary frequency shift key (MFSK) signaling schemes (M=2, 3, 4, ... ) for sending data over the communications channel 40. The transmitter amplifier 36 couples the modulator 34 to the communications channel 40. Additional circuitry may be inserted, such as a bandlimiting filter and/or a device for changing frequency or converting the frequency of the FM signal to a desired frequency for transmitting over the communications channel 40. If a bandlimiting filter is employed, then the effects of the bandlimiting filter are also compensated by the nonlinear equalizer.

The receiver amplifier 42 amplifies a received signal, which is then passed through the receiver filter 44. The receiver filter 44 may be a radio frequency (RF) filter at the front end of the receiver, or an intermediate frequency (IF) bandpass filter. The demodulator 46 may be any type of FM demodulator, and may use a phase-locked-loop (PLL) circuit, FM discriminator, or any other circuit for accomplishing the frequency demodulation.

The decoder 49 is optional and is used for decoding the trellis encoded data, which were encoded by the encoder 32. Preferably, the decoder 49 uses a Viterbi decoding algorithm, which is well known in the art. The decoder 49 is only used with an encoder 32.

The information sink 50 can be any sink to which the data are being sent from the information source 30. The information sink 50 may be a communications channel, a data receiver, a memory, or other sink. The information source 30 and the information sink 50 represent the data input and data output, respectively.

The nonlinear equalizer 48 is the focus of the present invention, and equalizes data from the demodulator 46 using a previous data output symbol. These previous data output symbols are taken from the decoder 49 when a decoder is employed. When the decoder 49 is not employed, then the decoder 49 is embodied as a decision circuit, and the previous data output symbols are the prior output from the decision circuit. The previous data output symbol is fed back from the output of the decoder 49 to the nonlinear equalizer 48 through the processor 60.

The nonlinear equalizer 48 adaptively reduces distortion from filtering. Digital FM is capable of power and bandwidth efficient data communication when measures are taken to compensate for distortion produced by receiver filtering. The receiver filtering distortion typically is produced by the receiver filter 44, but may also result from a bandlimiting filter in the transmitter and amplifier 36, the bandwidth of the communications channel 40 and the receiver amplifier 42. Filtering, which is necessary for proper receiver operation, reduces the resolution of the data decision circuitry, thereby reducing information rate. This impairment is corrected by an equalization technique that corrects for the effects of the filtering, enabling higher information rates in a given bandwidth than are possible without correction. The nonlinear equalizer 48 adaptively reduces the distortion to a minimum by a learning process. The nonlinear equalizer 48 may have an internal processor or have an external processor 60 coupled between the nonlinear equalizer and the decoder 49, for performing the calculations of the equalization process.

There are two components to the equalization process: the adaptation, or learning phase, and the operating phase.

Operating Phase

The present invention provides a method and apparatus for reducing distortion to a channel symbol of a channel symbol sequence, $\{s_k\}$, and is taught, by way of example, by reducing distortion of a $k^{th}$ information symbol of a channel symbol sequence, $\{s_k\}$, with $k^{th}$ being a generic reference to one of a plurality of symbols in a given sequence. An information symbol sequence, $\{i_k\}$, has a plurality of information symbols with each information symbol having a time duration with n bits, with n being a number of bits in each information symbol. The information symbol sequence is transformed by the encoder 32 to a channel symbol sequence, $\{s_k\}$, for modulating a carrier signal. The encoder 32 in a preferred embodiment encodes the information symbol sequence using a trellis code. For a zero memory encoder, the modulator 34 may include the encoder 32, as when trellis encoding is not used. In this case the modulator 34 transforms the information symbol sequence to the channel symbol sequence.

The channel symbol sequence has M symbols of an M-ary signalling scheme with index value, j, $1 \leq j \leq M$, with M being a number of channel symbols. The M-ary signalling scheme might have, by way of example, eight channel symbols (M=8), for an eight frequency-shift-keying (FSK)

signalling scheme. The channel symbols are amplified by transmitter amplifier 36 and sent over the communications channel 40. The receiver amplifier 42 amplifies the received channel symbols, which are also filtered by receiver filter 44.

As shown in FIG. 3, the method includes the step of demodulating 100, using a demodulator 46, a received signal as a received sample, $r_k$. The received signal includes a channel symbol, a distortion value and a noise value. Using processor 60, an index value, j, is determined 110 by the processor 60 from a previous information symbol interval. The index value, j, corresponds to the previously received channel symbol of the M-ary signal scheme. If an encoder and decoder are used and the decoder 49 uses the Viterbi algorithm, or if an equivalent trellis decoding algorithm were employed, then the index value j is determined by a zero memory trace back within the decoding algorithm.

Using the index value, j, the method includes the steps of selecting with the processor selects 120 using processor 60 an inverse distortion function, $f_j(r_k)$, for processing the received sample, $r_k$. A corrected sample, $\hat{s}_k$, is calculated by the processor 130 with processor 60 using the inverse distortion function, $f_j(r_k)$, for the index value. The method then comprises the step of determining with the processor 60 a value of an information symbol, $i_k$, and a next index, j, from the corrected sample, $\hat{s}_k$. Using the next index, j, the inverse distortion function, $f_j(r_k)$, is selected 150 for processing a subsequent received sample, $r_k$, in a subsequent information interval. When a trellis decoding is employed, the inverse distortion function is applied during the branch metric computation using the index value, j, found by zero memory trace back from the node being updated.

Let $r_k$ denote the analog output voltage sample from the demodulator 46 corresponding to the $k^{th}$ symbol interval. The received sample, $r_k$, includes a pure value of a channel symbol, $s_k$, a distortion value, $d_k$, and a noise value, $n_k$. At a transmitter, the modulator 34 can generate up to M channel symbols from an M-ary signalling scheme. The M-ary signalling scheme might have, for example, for eight channel symbols (M=8), an eight frequency-shift-keying (FSK) signalling scheme. The FSK signals can modulate a carrier signal at a carrier frequency. Thus, for eight FSK, the frequencies might be $f_1$=+7 kHz, $f_2$=+5 kHz, $f_3$=+3 kHz, $f_4$=+1 kHz, $f_5$=−1 kHz, $f_6$=−3 kHz, $f_7$=−5 kHz, and $f_8$=−7 kHz, with respect to the carrier frequency. This set of frequency offsets, when modulated by the carrier frequency, represent the channel signals which correspond to the set of channel symbols, $\{s_k\}$. If the channel symbol, $s_k$, is multidimensional, then each coordinate of the channel symbol, $s_k$, corresponds to a channel signal, which may have the foregoing FSK format, for example.

In general, $$r_k = s_k + d_k + n_k$$

It is desired to reduce the deviation $$|r_k - s_k| = |d_k + n_k|$$

to a minimum. This is done by finding an inverse distortion function, $f(r_k, i_{k-1})$, which in general may be nonlinear, to produce the corrected sample, $\hat{s}_k$:

$$\hat{s}_k = f(r_k, i_{k-1})$$

The inverse distortion function, $f(r_k, i_{k-1})$, depends on the history of the signal, from previously received waveforms, by way of the decision directed feedback of a previous information symbol, $i_{k-1}$, as shown in FIG. 1 by coupling an output of the decoder 49 to the nonlinear equalizer 48. A $k^{th}$ information symbol, $i_k$, in general has n bits. The information symbol, $i_k$, in the $k^{th}$ interval is transformed into a channel symbol, $s_k$. The channel symbol, $s_k$, is transmitted to the receiver using channel signal, $\Phi_k(t)$. For frequency modulation (FM), the waveform is a frequency variable, as in FSK. The waveform, $\Phi_k(t)$, gives rise to the received sample, $r_k$, at the output of an FM demodulator 46. The FM demodulator 46 may include a PLL circuit or discriminator. The received sample, $r_k$, is a sum which includes the channel symbol, distortion value and noise value. The distortion value, $d_k$, is a function of the previous channel symbol, $s_{k-1}$.

The inverse distortion function, $f(r_k, s_{k-1})$, is a regression function.

$$f(r_k, s_{k-1}) = E(s_k | r_k, s_{k-1})$$

If $s_k$ takes the values 1 to M, as in M-ary communication, then, the inverse distortion function, $f(r_k, s_{k-1})$, may be written as $$f(r_k, s_{k-1}) = f_j(r_k) \text{ if } s_{k-1} = j.$$

Thus, the set of M inverse distortion functions, $f_j(r_k)$, are used where $$f_j(r_k) = E(s_k | r_k, s_{k-1} = j).$$

For example, for the channel symbol, $s_k$, there can be a two, four or eight value for binary (M=2), 4-ary (M=4) and 8-ary (M=8). These values correspond to one, two or three bit information symbols. Thus, the inverse distortion function is indexed using j to refer to the possible values of the channel symbols. This provides a set of M inverse distortion functions, which depend on one variable, the sample value, $r_k$, $f_j(r_k)$.

The inverse distortion functions are dependent on one variable, namely the received sample, $r_k$. The simplest form of this function is a linear distortion function, $$f_j(x) = a_j x + b_j$$

Linear inverse distortion functions give adequate performance, though the technique may be generalized to nonlinear inverse distortion functions:

$$f_j(x) = a_{j,n} x^n + a_{j,n-1} x^{n-1} + \ldots + a_j$$

Note that the coefficients $a_{j,k}$ depend on the feedback index value j.

In summary, the algorithm operates as follows:

1. Determine the index value, j, from the previous channel symbol interval.

2. Using the inverse distortion function $f_j(x)$, compute the corrected sample, $$\hat{s}_k = f_j(r_k).$$

3. Supply the corrected sample, $\hat{s}_k$, to the decision circuit to determine the value of the information symbol, $i_k$.

4. In the subsequent equalization interval, the value of $\hat{s}_k$, which is an index value, j, selects the next inverse distortion function.

The next parameters $a_{j,k}$ are determined in the adaptation phase of the algorithm.

Enhanced Performance

The basic technique may be enhanced by processing multiple symbols simultaneously.

Let $R_k=(r_{k1}, r_{k2}, \ldots r_{km})$
be an m-dimensional sample vector of demodulator outputs.

As above, $R_k=S_k+D_k+N_k$, where $S_k$ is a vector of pure values of channel symbols, $D_k$ is a vector of distortion values and $N_k$ is a vector of noise values.

Consider the vector of pure values, $S_k$, as a symbol from an alphabet of $M^m$ characters. An encoding scheme is presumed to transform data values into this character set; a companion decision circuit maps received symbol values, $S_k$, or equalized received symbol values, $\hat{S}_k$, into the set of data values. The equalizer operates as follows:

$$\hat{R}_k=F_j(R_k) \text{ if } S_{k-1}=j$$

where the inverse distortion functions $F_j(R_j)$ are vector valued functions of the sample vector $R_k$. As above, the function used depends on the fed back data value j. The vector version of the algorithm requires more computation than the one dimensional version, so linear functions $F_j(R_j)$ are most appropriate. Thus $$F_j(R)=AR+B$$

where A is an m×m matrix and B is a vector. Again, the parameters A and B are determined in the adaptation phase.

Adaptation

Figure 4:
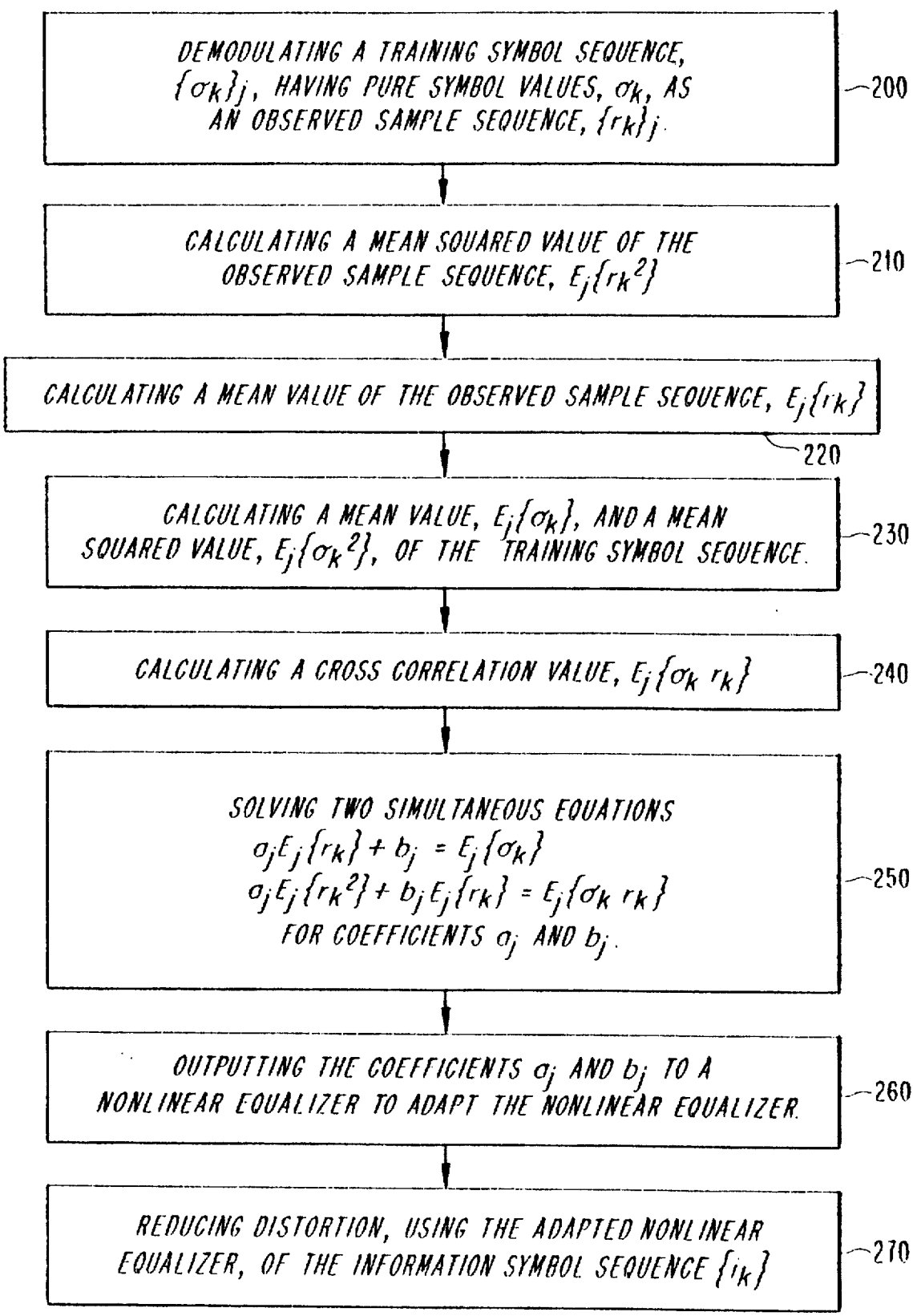
FIG. 4 is a flowchart of an adaptation phase of the present invention.

Another aspect of the invention is the adaptation phase. The adaptation phase adapts the nonlinear equalizer 48 using a linear distortion function, $f_j(x)=a_jx+b_j$, for reducing distortion of a $k^{th}$ channel symbol of a channel symbol sequence, $\{s_k\}$, with $k^{th}$ being a generic reference to one of a plurality of symbols in a given sequence. The index value, j, designates the particular subsequence, known a priori at the receiver, having the property that each of its elements is preceded by a channel symbol taking the $j^{th}$ index value. As shown in FIG. 4, for each index value, j, the method includes the step of demodulating 200 by the demodulator a training symbol sequence, $\{\sigma_k\}_j$, having pure symbol values, $\sigma_k$, as an observed sample sequence, $\{r_k\}_j$. A mean squared value, $E_j\{r_k^2\}$, is calculated by the processor 210 using processor 60 for the observed sample sequence. A mean value, $E_j\{r_k\}$, is calculated by the processor 220 for the observed sample sequence. A mean value, $E_j\{\sigma_k\}$, and mean squared value $E_j\{\sigma_k^2\}$, are calculated by the processor 230 for the training symbol sequence, using processor 60. A cross correlation value, $E_j(\sigma_k, r_k)$ is calculated by the processor 240. Two simultaneous equations $$a_jE_j\{r_k\}+b_j=E_j\{\sigma_k\}$$

$$a_jE_j\{r_k^2\}+b_jE_j\{r_k\}=E_j\{\sigma_k r_k\}$$

are solved by the processor 250 using processor 60 or coefficients $a_j$ and $b_j$.

The adaptation algorithm minimizes the mean squared error, $\epsilon$, with respect to the parameters a, b or A, B for the enhanced performance, multidimensional symbol case, $$\epsilon=E\{||\hat{S}_k-S_k||^2\}$$

or for the one dimensional version, $$\epsilon_1=E\{|\hat{s}_k-s_k|^2\}$$

with respect to the parameters A, B or a, b. The operator E{ } is the mathematical expectation operator. The one dimensional case will be explained in detail. Consider $$\epsilon_1 = \sum_{j=1}^{M} E\{|f_j(r_k) - s_k|^2 | s_{k-1}=j\}$$

where $E\{X|s_{k-1}=j\}$ is the conditional mathematical expectation of X given $s_{k-1}=j$. Write $E_j$ for this operator.

Assuming the inverse distortion function $f_j(r_k)$ is linear, $$E_j\{|f_j(r_k)-s_k|^2\}=E_j\{(a_jr_k+b_j-s_k)^2\}.$$

Minimizing this quantity with respect to $a_j$ and $b_j$, leads to the equations:

$$a_jE_j\{r_k\}+b_j=E_j\{s_k\}$$

$$a_jE_j\{r_k^2\}+b_jE_j\{r_k\}=E_j\{s_k r_k\}$$

which are easily solved for $a_j$ and $b_j$, when the expected values are known. Thus, it is necessary to estimate the quantities $E_j\{r_k^2\}$, $E_j\{r_k\}$, $E_j\{r_k s_k\}$ and $E_j\{s_k\}$. When a training symbol sequence is used, the quantity $E\{s_j\}$ is already known.

This is done as follows. Assume that a known data sequence is transmitted through the system, a training sequence. Then the receiver has knowledge of the value of the previous channel symbol, $s_{k-1}$, needed to select the inverse distortion function $f_j(r_k)$. The receiver also has knowledge of the pure symbol value, $s_k$, as well as the observed sample, $r_k$. The receiver separates the stream of received samples, $r_k$, and corresponding pure symbol values, $s_k$, into M substreams according to the value of the previous channel symbol, $s_{k-1}$. Thus, all samples, $r_k$, in the $j^{th}$ substream are characterized by the fact that $s_{k-1}=j$. These substreams, or subsequences, are used to estimate the needed quantities.

Thus, to estimate $E_j\{r_k\}$, recursively compute $$u_{n+1}=u_n+g_n[r_{n+1,j}-u_n]$$

where $r_{n,j}$ is the $n^{th}$ element of the $j^{th}$ subsequence. The sequence $g_n$ is given by $g_n=1/n$.

Similarly, $$\tau_{n+1}=\tau_n+g_n[(r_{n+1,j})^2-\tau_n]$$

$$\rho_{n+1}=\rho_n+g_n[[(r_{n+1,j})][s_{n+1}]-\rho_n]$$

The recursions converge to the desired values:

$$u_n \to E_j\{r_k\}$$

$$\tau_n \to E_j\{r_k^2\}$$

$$\rho_n \to E_j\{r_k s_k\}$$

The recursions are implemented easily using a microprocessor.

Alternative Approach To Nonlinear Equalization

An alternative approach to nonlinear equalization is to obtain an expression for the frequency output of the demodulator 46 and then determine the required thresholds as specified by the past history of the signal.

9

Consider an FM signal in noise $$v(t) = \sqrt{2P_s} \cos[w_m t + \Theta(t)] + n(t)$$

where v(t) is the input signal in white gaussian noise, n(t), $P_s$ is the signal power, $\Theta(t)$ is the FM modulated signal and n(t) is white gaussian noise with power spectral density, n/2. For simplicity assume $\Theta(t)$ includes a sequence of M frequency symbols, each symbol lasting for a time $T_s$. The M frequency symbols might have, for example, for six-channel symbols (M=6), a six frequency-shift-keying (FSK) signalling scheme. The FSK signals can modulate a carrier signal at a carrier frequency. Thus, for eight FSK, the frequencies might be $f_1$=+7 kHz, $f_2$=+5 kHz, $f_3$=+3 kHz, $f_4$=+1 kHz, $f_5$=−1 kHz, $f_6$=−3 kHz, $f_7$=−5 kHz, and $f_8$=−7 kHz, with respect to the carrier frequency.

Figure 2:
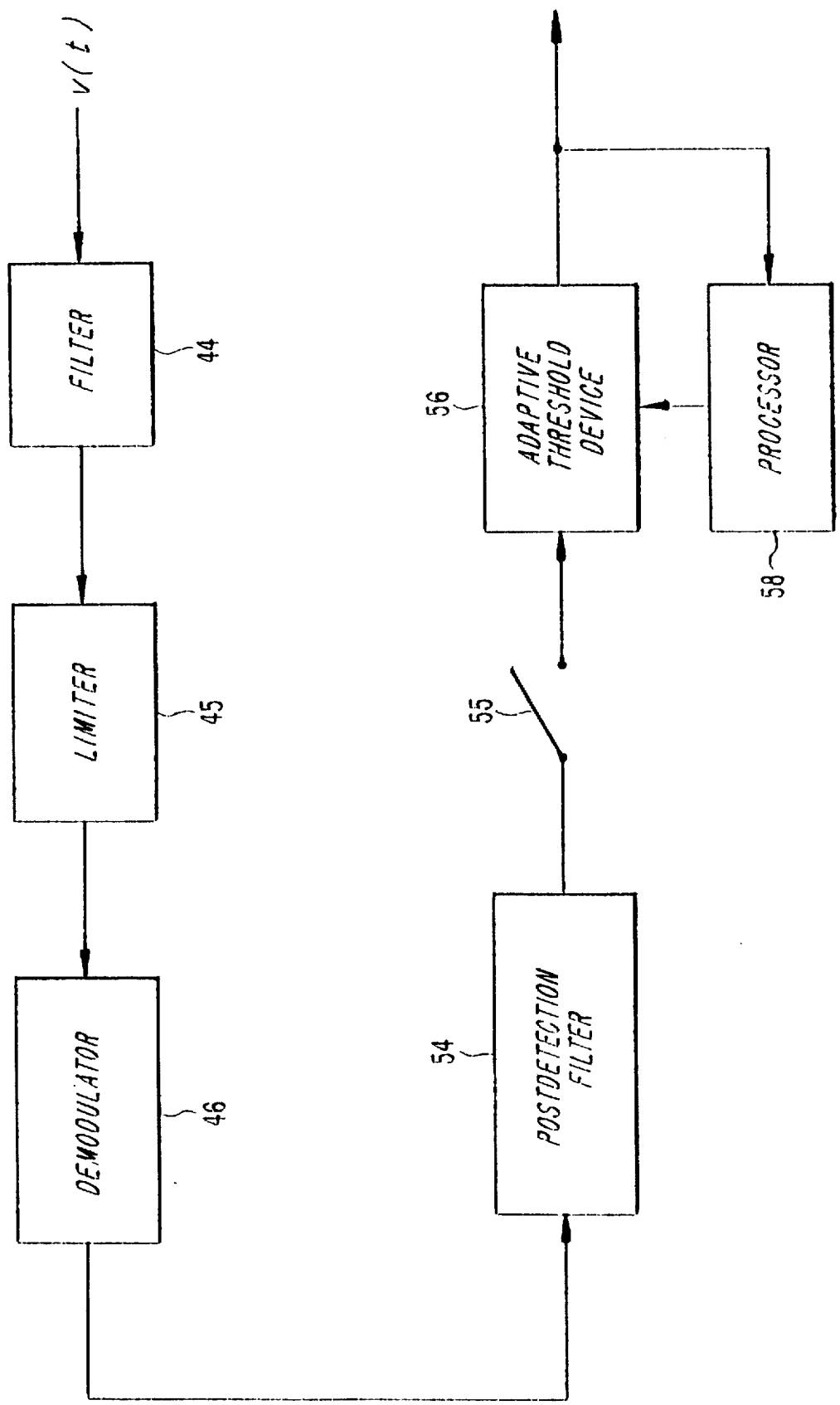
FIG. 2 shows an alternative block diagram of an FM data communications receiver using a nonlinear equalizer.

As illustratively shown in FIG. 2, the sum of FM signal and noise enters the receiver filter 44, embodied as an RF bandpass filter or an IF bandpass filter, followed by a hard limiter 45 and the FM demodulator 46. A phase-locked-loop circuit or other FM demodulator could be used as well. Harmonic signals higher than $f_m$ are rejected by a wideband filter. Although the band restricting receiver filter 44 is considered to be part of the receiver, the results are applicable to the situation where part of the band restriction occurs in the communications channel 40 or in a filter at the transmitter. Assuming arithmetic symmetry for the receiver filter 44, the output of the hard limiter 45 following the receiver filter 44 is $$v_o(t) = \cos[w_m t + \Phi(t) + w(t)]$$

where $\Phi(t)$ is the filtered signal phase $$\Phi(t) = \tan^{-1} \frac{\int_{-\infty}^{t} h(t-\tau)\sin\theta(\tau)d\tau}{\int_{-\infty}^{t} h(t-\tau)\cos\theta(\tau)d\tau} = \tan^{-1} N(t)/D(t) = \tan^{-1} U(t)$$

where h(t) is the low pass equivalent of the bandlimiting receiver filter 44. Since the FM signal is continuous phase, $$\theta(t) = W_{n-1}(t - nT_s) + \sum_{i=1}^{n} W_i T_s$$

$$nT_s \leq t \leq (n+1)T_s$$

To obtain error rate it is necessary to know the receiver output due to signal in the absence of noise. The output phase from the FM demodulator 46 is the derivative of the signal phase $$\Phi = \frac{\dot{U}}{1+U^2} = \frac{D\dot{N} + \dot{N}D}{N^2 + D^2}$$

The postdetection filter 54, which is an integrate-and-dump filter which may be embodied as a lowpass resistor-capacitor (RC) circuit with an integration time of $T_s$, "reintegrates" this derivative producing a phase difference $$\Phi_s(t) = \int_{t-T_s}^{t} \Phi(\tau)d\tau = \Phi(z) - \Phi(z - T_s)$$

At the end of each interval $T_s$ the output of the integrate and dump filter is sampled by sampler 55. At $z=(n+1)T_s$

10

$$d\Phi[(n+1)T_s] = \Phi[(n+1)T_s] - \Phi(nT_s)$$

where the phases at time $(n+1)T_s$ and $nT_s$ are obtained as follows:

$$\Phi[(n+1)T_s] = \tan^{-1} u[(n+1)T_s]$$

$$\Phi(nT_s) = \tan^{-1} u(nT_s)$$

$$d\Phi[(n+1)T_s] = \tan^{-1}\left(\frac{u[(n+1)T_s] - u(nT_s)}{1 + u[(n+1)T_s] \cdot u(nT_s)}\right)$$

or, $$d\Phi[(n+1)T_s] =$$

$$\tan^{-1}\left(\frac{N[(n+1)T_s] \cdot D(nT_s) - D[(n+1)T_s] \cdot N(nT_s)}{D[(n+1)T_s] \cdot D(nT_s) + N[(n+1)T_s] \cdot N(nT_s)}\right)$$

The phase change during any time interval $T_s$ is less than or equal to $\pi/2$ to ensure narrowband operation.

Since in M-ary continuous phase FSK (CPMFSK) communications systems the transmitted signal, for the symbol interval $T_s$, is of frequency $f_o$ or $f_1 \ldots$ or $f_{m-1}$, a set of M−1 thresholds in threshold device 56 are placed between every two adjacent possible outputs.

$$T_s[(n+1)T_s] = \frac{\Phi_{k-1}[(n+1)T_s] + \Phi_k[(n+1)T_s]}{2}$$

$$K = 1, \ldots, m-1$$

where $\Phi_k[(n+1)T_s]$ is the phase at the $(n+1)T_s$ time interval when the symbol k is received.

However, the distortion of the received CPMFSK signal generated by the narrow-band IF filter shifts the thresholds of the adaptive threshold device 56 into improper decision levels. The amount of shift of threshold levels can be calculated.

$$dT_k[(n+1)T_s] = T_k[(n+1)T_s] - T_k(nT_s)$$

$$dT_k[(n+1)T_s] = \frac{d\Phi_{k-1}[(n+1)T_s] + d\Phi_k[(n+1)T_s]}{2}$$

To correct the threshold levels, add the effect of shift of central threshold level $$dT_{\frac{n-1}{2}}$$

using processor 58 to all threshold levels and adjusting the threshold levels in the adaptive threshold device 56.

It will be apparent to those skilled in the art that various modifications can be made to the nonlinear equalizer of the instant invention without departing from the scope or spirit of the invention, and it is intended that the present invention cover modifications and variations of the nonlinear equalizer provided they come within the scope of the appended claims and their equivalents.

We claim:

1. A method using a demodulator and a processor for reducing distortion of a $k^{th}$ information symbol of an information symbol sequence, $\{i_k\}$, with $k^{th}$ being one of a plurality of information symbols in the information symbol sequence, with each information symbol of the plurality of information symbols having an information interval with n bits, with n being a number of bits in the information interval, the information symbol sequence being transformed to a channel symbol sequence of an M-ary signalling scheme with index value, j, $1 \leq j \leq M$, with M being a number of channel symbols, for modulating a carrier signal, comprising the steps of:

demodulating with said demodulator a received signal as a received sample, $r_k$, the received signal including a channel symbol, a distortion value and a noise value;

determining with said processor an index value, j, from a previous channel symbol;

selecting with said processor, using the index value, j, an inverse distortion function, $f_j(r_k)$, for processing the received sample, $r_k$;

computing with said processor a corrected sample, $\hat{s}_k$, using the inverse distortion function, $f_j(r_k)$, for the index value;

determining with said processor for each value of an information symbol $i_k$ as a corrected information symbol, $\hat{i}_k$, and determining with said processor a next index, j, from the corrected sample, $\hat{s}_k$;

generating, using the corrected information symbol for each value of the information symbol sequence and the next index from the corrected sample, a corrected information symbol sequence, $\{\hat{i}_k\}$, as an output signal to enable higher information rates in a given bandwidth.

2. A method using a demodulator, a nonlinear equalizer, and a processor having, for a variable x, a linear distortion function, $f_j(x)=a_j x+b_j$, with a and b being variable coefficients and j being an index value, for reducing distortion of a $k^{th}$ information symbol of an information symbol sequence, $\{i_k\}$, with $k^{th}$ being one of a plurality of information symbols in the information symbol sequence, with each information symbol of the plurality of information symbols having an information interval with n bits, with n being a number of bits in the information interval, the information symbol sequence being transformed to a channel symbol sequence of an M-ary signalling scheme with index value, j, $1 \leq j \leq M$, with M being a number of channel symbols, for modulating a carrier signal, comprising the steps, for each index value, j, of:

demodulating with said demodulator a training symbol sequence, $\{\sigma_k\}_j$, having pure symbol values, $\sigma_k$, as an observed sample sequence, $\{r_k\}_j$;

calculating with said processor a mean squared value of the observed sample sequence, $E_j\{r_k^2\}$;

calculating with said processor a mean value of the observed sample sequence, $E_j\{r_k\}$;

calculating with said processor a mean value, $E_j\{\sigma_k\}$, and a mean squared value, $E_j\{\sigma_k^2\}$, of the training symbol sequence;

calculating with said processor a cross correlation value, $E_j\{\sigma_k r_k\}$;

solving with said processor, using the calculated mean value of the observed sample sequence $E_j\{r_k\}$, the calculated mean value of the training symbol sequence $E_j\{\sigma_k\}$ and the calculated cross correlation value $E_j\{\sigma_k r_k\}$, two simultaneous equations $$a_j E_j\{r_k\}+b_j=E_j\{\sigma_k\}$$

$$a_j E_j\{r_k^2\}+b_j E_j\{r_k\}=E_j\{\sigma_k r_k\}$$

to determine coefficients $a_j$ and $b_j$;

outputting determined coefficients $a_j$ and $b_j$ to the nonlinear equalizer;

adapting, responsive to the determined coefficients, the nonlinear equalizer; and reducing, using the adapted nonlinear equalizer, distortion of the information symbol sequence, $\{i_k\}$.

3. The method as set forth in claim 2 further including the steps of:

demodulating a received signal as a received sample, $r_k$, the received signal including a channel symbol, a distortion value and a noise value;

determining an index value, j, from a previous information symbol interval;

selecting, using the index value, j, an inverse distortion function, $f_j(r_k)$, for processing the received sample, $r_k$;

computing a corrected sample, $\hat{s}_k$, using the inverse distortion function, $f_j(r_k)$, for the index value; and determining with said processor for each value of an information symbol $i_k$, as a corrected information symbol, $\hat{i}_k$, and determining with said processor a next index, j, from the corrected sample, $\hat{s}_k$, for generating a corrected information symbol sequence, $\{\hat{i}_k\}$, as an output signal to enable higher information rates in a given bandwidth.

4. The method as set forth in claim 3 further including the step of:

selecting, using the next index, j, the inverse distortion function, $f_j(r_k)$, for processing a subsequent received sample, $r_k$, in a subsequent information interval.

5. A communications system for reducing distortion of information symbol sequences, $\{i_k\}$, the communications system comprising:

an information source for providing data;

a communications channel, operatively coupled to the information source;

a modulator, operatively coupled to the communications channel, for sending the data over the communications channel;

a receiver amplifier, operatively coupled to the communications channel, for amplifying a received signal;

a receiver filter, coupled to the receiver amplifier, for filtering the received signal;

a demodulator, coupled to the receiver filter, for demodulating, during an operating phase, the filtered received signal, and for demodulating, during an adaptation phase, a training symbol sequence, $\{\sigma_k\}_j$, having pure symbol values, $\sigma_k$, as an observed sample sequence, $\{r_k\}_j$;

a nonlinear equalizer, coupled to the demodulator, for equalizing data from the demodulator using a previous data output symbol, said nonlinear equalizer having a processor, said processor for calculating a mean squared value of the observed sample sequence, $E_j\{r_k^2\}$, for calculating a mean value of the observed sample sequence, $E_j\{r_k\}$, for calculating a mean value, $E_j\{\sigma_k\}$, and a mean squared value, $E_j\{\sigma_k^2\}$, of the training symbol sequence, for calculating a cross correlation value, $E_j\{\sigma_k r_k\}$, and for solving two simultaneous equations $$a_j E_j\{r_k\}+b_j=E_j\{\sigma_k\}$$

$$a_j E_j\{r_k^2\}+b_j E_j\{r_k\}=E_j\{\sigma_k r_k\}$$

for coefficients $a_j$ and $b_j$; and wherein said nonlinear equalizer, responsive to the coefficients $a_j$ and $b_j$, adapts for reducing distortion of the information symbol sequence $\{i_k\}$.

6. The communications system as set forth in claim 5, with the demodulator demodulating the filtered received signal as a received sample, $r_k$, the filtered received signal including a channel symbol, a distortion value and a noise value; and with said processor:

determining an index value, j, from a previous channel symbol;

selecting using the index value, j, an inverse distortion function, $f_j(r_k)$, for processing the received sample, $r_k$;

computing a corrected sample, $ŝ_k$, using the inverse distortion function, $f_j(r_k)$, for the index value; and determining for each value of an information symbol, $i_k$, as a corrected information symbol, $î_k$, and determining a next index, j, from the corrected sample, $ŝ_k$, for generating a corrected information symbol sequence, $\{î_k\}$, as an output signal to enable higher information rates in a given bandwidth.

7. The communications system as set forth in claim 5, further comprising:

an encoder, coupled between the information source and the modulator, for encoding data from the information source.

8. The communications system as set forth in claim 7, further comprising:

a decoder, coupled to an output of the nonlinear equalizer, the decoder having an output coupled to an input of the processor, the decoder for decoding data encoded by the encoder.

9. A method for adaptively reducing distortion in an information symbol sequence transmitted over a communications channel comprising:

generating data at an information source;

modulating, using a modulator coupled to the information source, the data;

sending the modulated data over the communications channel to a receiver amplifier;

receiving, at the receiver amplifier, the modulated data as a received signal;

amplifying the received signal;

filtering, at a receiver filter coupled to the receiver amplifier, the amplified-received signal;

demodulating, at a demodulator coupled to the receiver filter, the filtered-amplified-received signal as demodulated data;

equalizing, at a nonlinear equalizer coupled to the demodulator, the demodulated data using a previous data output symbol;

generating, at the nonlinear equalizer, a corrected information symbol sequence as an output signal;

reducing, responsive to the output signal, distortion in the information symbol sequence;

demodulating a training symbol sequence having pure symbol values as an observed sample sequence;

calculating, using a processor coupled to the nonlinear equalizer, a mean value and a mean squared value of the observed sample sequence;

calculating, using the processor, a mean value and a mean squared value of the training symbol sequence;

calculating, using the processor, a cross correlation value for the mean value of the training symbol sequence and the mean value of the observed sample sequence; and adapting the nonlinear equalizer, responsive to the mean value and the mean squared value of the observed sample sequence, the mean value and the mean squared value of the training symbol sequence, and the cross correlation value, for reducing distortion in the information symbol sequence.

\* \* \* \* \*

UNITED STATES PATENT AND TRADEMARK OFFICE
CERTIFICATE OF CORRECTION

PATENT NO. : 5,740,206
DATED : April 14, 1998
INVENTOR(S) : Lomp et al.

It is certified that error appears in the above-identified patent and that said Letters Patent is hereby corrected as shown below:

In claim 1, column 11, line 16, please delete " $i_k$" and insert therefor --, $i_k$, --.

In claim 3, column 12, line 16 after "symbol" please insert --,--.

Signed and Sealed this

Tenth Day of November 1998

Attest:

BRUCE LEHMAN

*Attesting Officer*  *Commissioner of Patents and Trademarks*